May 21, 1940.　　　L. McK. GLEN　　　2,201,895
ROTARY PLUG VALVE WITH SPHERICAL PLUGS
Filed Aug. 10, 1938
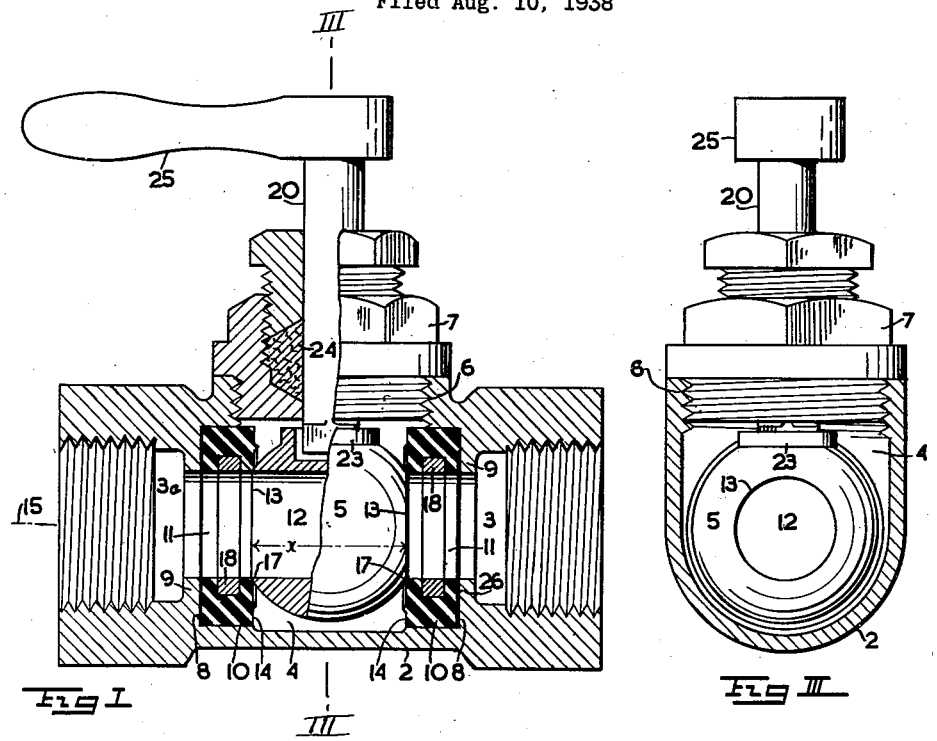
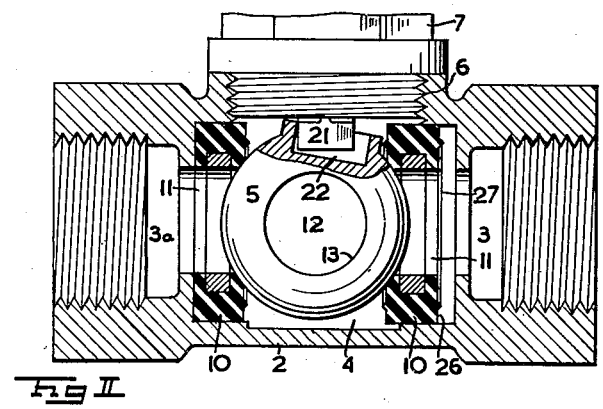
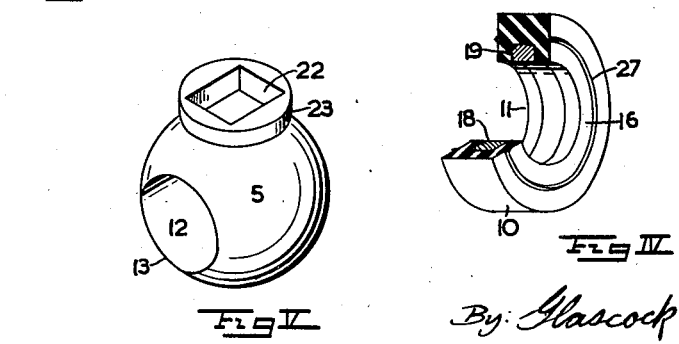
L. McK. Glen, Inventor
By: Glascock Downing & Seebold, Attys.

UNITED STATES PATENT OFFICE 2,201,895

ROTARY PLUG VALVE WITH SPHERICAL PLUGS

Lauchlan McKinnon Glen, Durban, Union of South Africa

Application August 10, 1938, Serial No. 224,210
In Great Britain July 18, 1938

2 Claims. (Cl. 251—113)

This invention relates to rotary plug valves with spherical plugs. A known form of such a valve comprises a casing which provides a fluid passage, a chamber for the plug fitted at the top with a removable cover and sockets coaxial with the fluid passage on either side of the chamber and opening to said chamber and having their bases rigidly spaced apart, rubber rings, internally reinforced, and housed in said sockets and constituting seat members for the spherical plug which is formed with a diametral passage and is rotatable to bring said passage into alinement with or transverse to the seat member apertures, the plug having at its underside a trunnion engaged in a bearing provided by the casing and having formed in its upper side a hole which intersects its diametral passage and comprises a rectangular portion engaged by the similarly rectangular portion of the spindle by which the spherical plug is rotated.

An object of the invention is so to improve the construction of a valve of this kind that its fluid tightness depends to a large extent on the pressure of the fluid within the valve and is the more efficient as such pressure is higher.

According to the invention, in a valve of the kind above described, the seat members are free to slide in their sockets, the spherical plug is, in all its angular positions, free to move axially with them, the passage through said plug affords no communication between the valve passage and the plug chamber otherwise than through its end orifices while the plug is between its open and closed positions, and the means engaging the plug for rotating it to bring its passage into alinement with or transverse to the seat member apertures, leaves the plug always free for such axial movement.

The invention is illustrated in the accompanying drawing in which:

Figure I is a longitudinal section of the rotary plug valve, showing the parts when not under fluid pressure; the valve being shown open.

Figure II is a similar section showing the valve closed and under fluid pressure.

Figure III is an end view showing the valve body sectioned on III—III, Figure I.

Figure IV—shows a seat ring detached.

Figure V shows the plug detached.

Referring to the drawing, 2 indicates a valve casing providing the fluid passage comprising sections 3, 3a between which is a chamber 4 for the plug 5. Access to the chamber is through an opening 6 closed by a removable cover 7.

8, 8 are sockets co-axial with and of larger diameter than the passage 3, 3a and provided in the casing 2, one on each side of the chamber 4. Said sockets open towards the chamber 4; their bases being formed by the annular inward flanges 9.

A rubber seat member 10 is inserted into each socket 8 through the opening 6 and the chamber 4. Said member has a cylindrical aperture 11 forming a continuation of its adjacent casing passage section 3 or 3a. The external form of the seat member and the internal form of the socket are such that the member can slide pistonwise in the socket. Preferably both are cylindrical as shown; the seat member being accordingly a cylindrical ring. Each ring is a slack fit in its socket so as to slide easily therein.

The plug 5 is a ball in that its external surface is spherical to at least the extent mentioned below. Formed through it is the diametral passage 12, which has no outlet to the ball surface otherwise than at its orifices 13. When the seat members are normally positioned as in Figure I, the distance between their opposed faces 14 is made rather less than the length (see Figure I) of the ball between its orifices 13, so that the ball has to be pressed into its position between them, viz. the position in which a diameter of it coincides with the axis 15 of the valve: and when it is in that position it presses in the material of the lips 16 of the aperture 11 to form seats 17.

The casing is made in one piece in the sense that the inward flanges 9 form rigid abutments for the seat members, and are rigidly spaced from one another at the required distance apart and enclose said seat members and the ball between them; as a consequence of which said seat members and ball can be inserted into and withdrawn from the casing only through the opening 6. To adapt the valve for use with an oil-carrying fluid the seat members 10 may be made of oil-resisting rubber.

Since any portion of a spherical surface seats completely on a circle of smaller diameter, the ball in the present case readily comes to a proper seating in the circular mouths of the apertures 11 of the seat members and without regard to its angular position; and it does so the more readily and completely to the extent that it is not constrained otherwise than by the seat members. In the present case the ball is completely supported by the seat members, without any support from or constraint by the casing. As is apparent from Figures I and III, the ball is nowhere in contact with the casing.

The surface of the plug need only be spherical at the portions which may make contact with the lips 16, that is in an equatorial zone which is parallel with the passage 12 and is of about the same width as the diameter of the mouths 13 of said passage.

The fact that the spherical surface of the plug contacts with rubber which conforms to moderate inequalities of the surface without breaking the seal therewith, enables such spherical surface to be manufactured without precision and therefore cheaply.

Whilst it is important that the body of the seat member and particularly its external surfaces should be of moderately soft rubber, it is also important that said member should be undeformable from its ring shape in order to enable it to maintain that shape against the frictional drag of the plug when the latter is rotated, and also that it may act as a piston in its socket. It is accordingly reinforced internally by a stiff ring 18, for instance a metal ring, which may be pressed into a groove 19 formed in the wall of the aperture 11; thus leaving the rubber surface intact at the three external faces of the seat member.

In the example shown each seat member is reversible face for face and the two members are identical, thus making the valve usable for flow in either direction.

The plug is rotated by the spindle 20 extending through the cover 7. The connection between said spindle and the plug 5 is such that, in whatever direction the plug may be turned, it transmits rotation with material positiveness but avoids interference with the freedom of the plug to move in the direction of the axis 15 of the valve. With this object the spindle 20 is shown as formed with a rectangular sectioned head 21 which engages in a similarly shaped pocket 22. Said pocket is formed in a boss 23 projecting from the plug, and does not break through into the ball passage 12. The head fits the pocket loosely, particularly in the direction transverse to the passage in the plug, in which direction the plug is likely to be displaced farthest when moving as a unit with the seat members as described below. However, it is not an essential feature of the connection that it allows the whole of the plug 5 to move axially; it is sufficient if the connection allows the centre of the plug freedom of movement along the valve axis 15, for which purpose it is only necessary for the connection to be such that whilst transmitting rotational movement, it allows the plug to tilt and simultaneously allows the pocket 22 to drop slightly down from the head 21 without losing rotational engagement therewith. Such a condition is shown in Figure II; and as remarked above the tilting of the plug relatively to the seats 10 does not impair the seal between them. The spindle is packed at 24 and is fitted with a handle 25 for rotating it.

The valve is operated like any other rotary plug valve, that is to say in order to open the valve the plug 5 is rotated by its spindle 20 to bring its passage 12 into line with the seat apertures 11, 11; whilst turning of the plug through 90 degrees from the last-mentioned position brings the unbroken spherical surfaces of the plug into the orifices 16 and so closes both the passage sections 3, 3a.

When the pressure within the valve is substantially atmospheric, a light seal is maintained between the plug and the seat members (Figure I) by the initial pressure and deformation of the lips 16 brought about by pressing the plug into position as above described. It is desirable that this pressure should be sufficient to maintain the plug at any angular position at which it is set. However, the important result of the construction above described is that pressure of the fluid within the valve favourably affects the sealing and that the effectiveness of the sealing increases with increase of pressure.

It has been stated that the seat members 10 are free to slide in their sockets and that the plug 5 has freedom for axial movement, whatever its angular position. These three members accordingly form a unit which is capable of being compressed and shortened axially, and when so shortened, of being free to move between the flanges 9. Assuming atmospheric pressure in the chamber 4, such axial compression occurs whenever fluid under pressure is present in the pipe line. If for instance the valve is closed as shown in Figure II and fluid pressure is present in the right-hand end of the valve, the outer face 26 of the right-hand seat member 10 and the surface of the plug within the aperture 11 of said member are exposed to such pressure, which tends to drive the unit—consisting of the two seat members and the plug—to the left. Movement of the unit is limited by the left-hand flange 9, against which the unit is accordingly compressed by the fluid acting on its right-hand end, as shown in Figure II. Endwise compression of the seat units causes them to bulge circumferentially and make sealing contact with the walls of the sockets 8. This prevents leakage of fluid from the passage section 3 to the other section 3a by a path around the outside of the unit. Another effect is that pressure at the contact of the plug with the seats 17 is increased, with corresponding tightening of the seal at those points.

There being no aperturing which provides communication between the plug passage 12 and the chamber 4, the absence of pressure above atmospheric pressure in said chamber is normal; but during the act of opening or closing the valve, communication between the said fluid passage and the chamber necessarily occurs. Were the pressure thus introduced into the chamber to persist, the automatic sealing effect described would be prevented, but even with the greatest frequency of opening and closing which can be expected in the use of a valve of the kind in question, pressure thus set up in the chamber 4 during the opening or closing movement is found to disappear sufficiently rapidly to be no hindrance to the self-sealing properties of the valve. Although the chamber 4 is sealed sufficiently by the packing 24 to prevent noticeable leakage of fluid during the opening and closing movement, the standard of tightness usual in packing for the spindles in this kind of valve is sufficiently imperfect (certainly after the spindle has been turned a few times) to allow quick escape of the quantity of fluid, sufficient to bring the chamber substantially to atmospheric pressure almost immediately after the opening or closing movement is completed. As will be apparent from Figures I and III the volume of the chamber 4 is made very little greater than that of the ball 5, so that the actual volume of fluid which can be present in chamber 4 is very small and consequently a slight leakage quickly diminishes its pressure, especially when the fluid is a liquid.

One useful effect of pressure being set up in the plug chamber during the rotation of the plug is that, during its momentary existence, such pressure, by acting on the inward faces 14 of the seat members, relieves the pressure exerted by the seats 17 on the plug and so enables rotation of the plug to be completed with less effort than if such seat pressure were maintained at full strength. Actually it has been found that the valve can be opened more easily when under high pressure than when under moderate pressure.

When the valve is open and passing fluid under pressure the unit consisting of the two seat members and the plug is compressed endwise much in the manner described and with the same sealing effect; but both ends of the unit being then exposed to fluid pressure, the unit is not necessarily driven against one of the flanges 9, but floats and may take up any position between said flanges.

The useful result of the automatic sealing during the time the valve is open is that there is during that time no leakage into the chamber 4 which would require to be held back by the packing 24. In fact said packing has no function to perform except during the momentary periods during which the valve is being opened or closed.

The face of each seat member which makes contact with the flange 9, that is, each face in the case of a reversible seat member, is formed with a projecting annular ridge 27 of pointed section. This is small enough to make contact with the shoulder surface before the main area of the face makes contact therewith; but substantially to disappear into the mass of the rubber seat body when subjected to a substantial pressure as indicated in Figure II. When the valve is used to control water which is not highly clarified, a fine deposit from the water is apt to collect between the shoulder surface and the adjacent seat member face and to interfere with their effective contact. It is found that the small sharp ridge disturbs this deposit sufficiently to break its adherence to the surfaces, enabling it to be carried away by the flowing fluid. The ridge has also the useful effect of preventing complete contact of the seat member with the flange 9 when pressure is absent; with the result that when the fluid enters the valve under pressure it is enabled easily to penetrate between said surfaces and so facilitate the endwise compression of the seat members which is necessary for the automatic sealing.

I claim:

1. A rotary plug valve comprising a casing which provides a fluid passage, a chamber for the plug open at the top for insertion and withdrawal of the plug and seat members, and sockets on either side of and opening to said chamber and co-axial with the fluid passage, and having their bases rigidly spaced apart, said valve also comprising a removable cover for the chamber, seat members housed in said sockets and free to slide axially therein, said seat members being formed of resiliently yielding material so reinforced against bodily deformation as to leave said material intact at their external surfaces, said seat members providing axial cylindrical apertures in continuation of the casing passage, a spherical plug seated in the mouths of the apertures of the seat members and having in all its angular positions freedom of axial movement limited solely by the seat members, the plug being formed with a diametral passage which affords no communication between the valve passage and the plug chamber otherwise than through its end orifices while the plug is between its open and closed positions, the seat members being compressible and shiftable as a unit with the plug by line pressure when the plug is closed, and means engaging the plug for rotating it to bring its passage into alinement with or transverse to the seat member apertures, whilst leaving the plug always free for the aforesaid axial movement.

2. A rotary plug valve comprising a casing which provides a fluid passage, a chamber for the plug open at the top for insertion and withdrawal of the plug and seat members, and cylindrical sockets on either side of an opening to said chamber and co-axial with the fluid passage, and having their bases rigidly spaced apart, said valve also comprising a removable cover for the chamber, seat members housed in said sockets and free to slide axially therein, said seat members each consisting of a cylindrical ring of soft rubber internally reinforced by a rigid ring which leaves the rubber surface intact at the three external faces of the seat member, each ring having a projecting annular ridge at at least one of its end surfaces, and providing an axial cylindrical aperture in continuation of the casing passage, a spherical plug seated in the mouths of the apertures of the seat members and supported solely by its engagement in said mouths and having in all its angular positions freedom of axial movement limited solely by the seat members, the plug being formed with a diametral passage which affords no communication between the valve passage and the plug chamber otherwise than through its end orifices while the plug is between its open and closed positions, the seat members being compressible and shiftable as a unit with the plug by line pressure when the plug is closed, and means engaging the plug for rotating it to bring its passage into alinement with or transverse to the seat member apertures, whilst leaving the plug always free for the aforesaid axial movement.

LAUCHLAN McKINNON GLEN.